United States Patent
Tsukahara et al.

(10) Patent No.: US 10,402,085 B2
(45) Date of Patent: Sep. 3, 2019

(54) DISPLAY OF CONTENT BASED ON HANDWRITTEN INPUT

(71) Applicant: SONY CORPORATION, Tokyo (JP)

(72) Inventors: Tsubasa Tsukahara, Tokyo (JP); Ikuo Yamano, Tokyo (JP); Miwa Ichikawa, Tokyo (JP); Hiroyuki Mizunuma, Tokyo (JP); Yoshihito Ohki, Tokyo (JP); Yasuyuki Koga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 127 days.

(21) Appl. No.: 14/654,808

(22) PCT Filed: Dec. 16, 2013

(86) PCT No.: PCT/JP2013/083599
§ 371 (c)(1),
(2) Date: Jun. 22, 2015

(87) PCT Pub. No.: WO2014/103775
PCT Pub. Date: Jul. 3, 2014

(65) Prior Publication Data
US 2015/0355835 A1 Dec. 10, 2015

(30) Foreign Application Priority Data
Dec. 28, 2012 (JP) .................. 2012-286723

(51) Int. Cl.
| G06F 3/0488 | (2013.01) |
| G06F 3/01 | (2006.01) |
| G06T 11/20 | (2006.01) |
| G06T 11/60 | (2006.01) |
| G06F 3/0354 | (2013.01) |
| G06K 9/00 | (2006.01) |

(52) U.S. Cl.
CPC .......... *G06F 3/04883* (2013.01); *G06F 3/017* (2013.01); *G06F 3/03545* (2013.01); *G06F 3/0488* (2013.01); *G06K 9/00402* (2013.01); *G06K 9/00422* (2013.01); *G06T 11/20* (2013.01); *G06T 11/206* (2013.01); *G06T 11/60* (2013.01)

(58) Field of Classification Search
CPC .... G06F 3/0488; G06F 3/04883; G06F 3/017; G06K 9/00402; G06K 9/03; G06K 9/00476
USPC .......................................................... 345/173
See application file for complete search history.

(56) References Cited

U.S. PATENT DOCUMENTS

| 5,287,417 | A * | 2/1994 | Eller | ...................... G06K 9/222 345/619 |
| 5,465,325 | A * | 11/1995 | Capps | ................. G06F 3/04845 345/441 |
| 7,324,691 | B2 * | 1/2008 | Li | .......................... G06K 9/222 382/181 |
| 2004/0027397 | A1 * | 2/2004 | Sato | ...................... G06F 3/0421 715/863 |

(Continued)

*Primary Examiner* — Yuzhen Shen
(74) *Attorney, Agent, or Firm* — Chip Law Group

(57) ABSTRACT

Provided is an information processing device including: an acquisition unit configured to acquire a content of a handwritten input on a touch panel; and a display control unit configured to control display of a shaped figure which is obtained by shaping a figure recognized from the handwritten input, according to the content of the handwritten input.

8 Claims, 15 Drawing Sheets

(56) References Cited

U.S. PATENT DOCUMENTS

2010/0171754 A1* 7/2010 Hatfield ............. G06K 9/00416
                                                            345/619
2012/0050171 A1* 3/2012 Wong ...................... G06F 3/044
                                                            345/173

* cited by examiner

FIG. 6
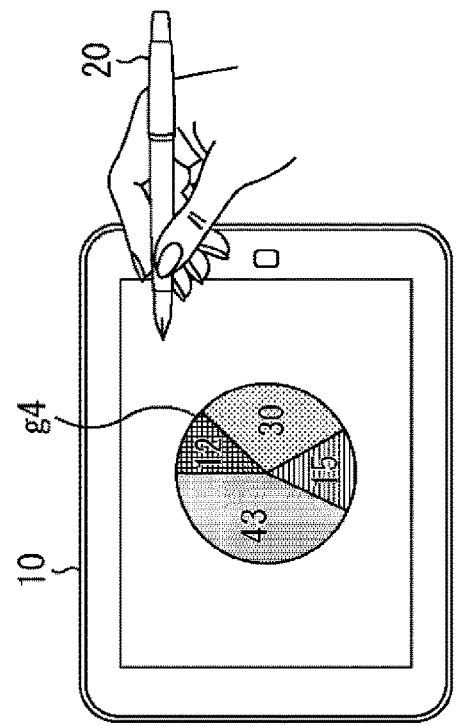
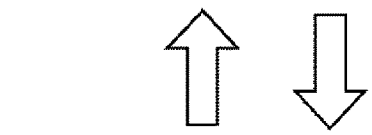
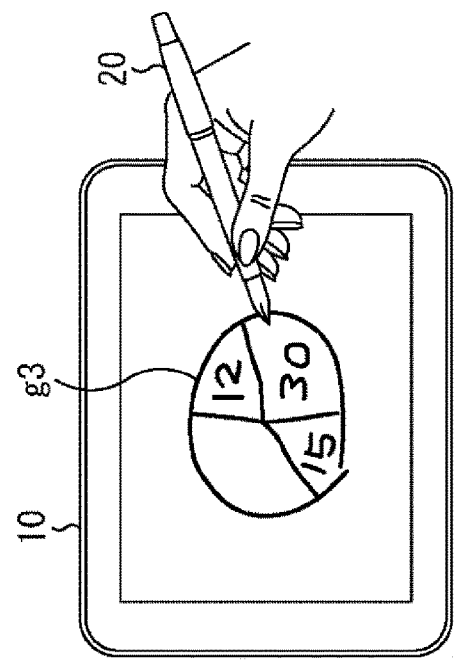

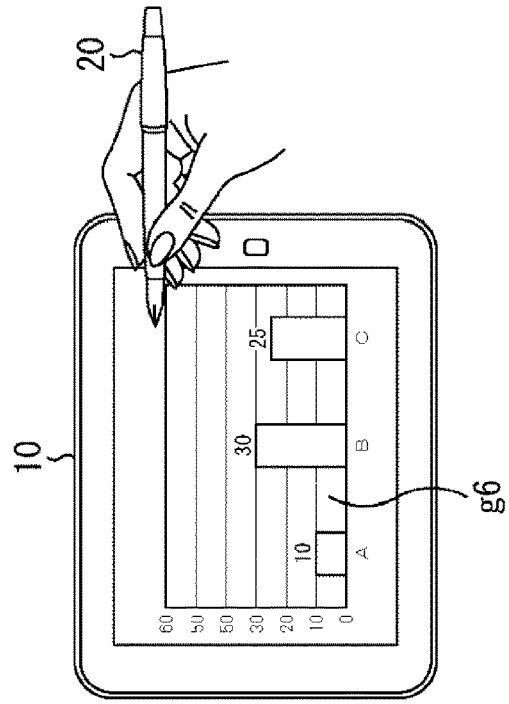
FIG. 7
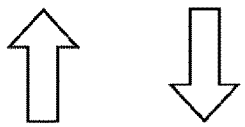
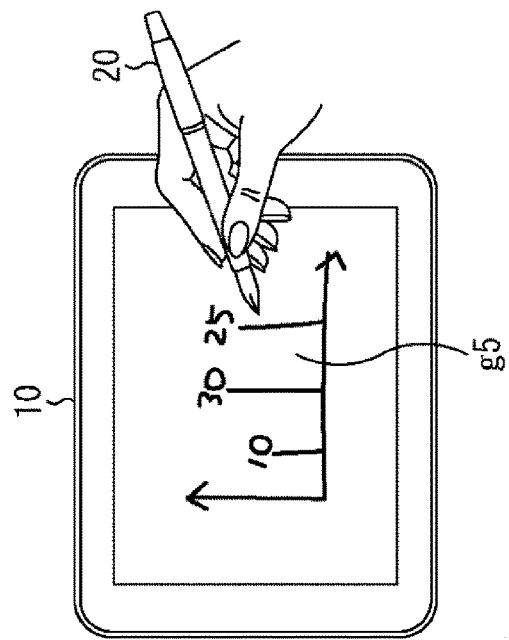

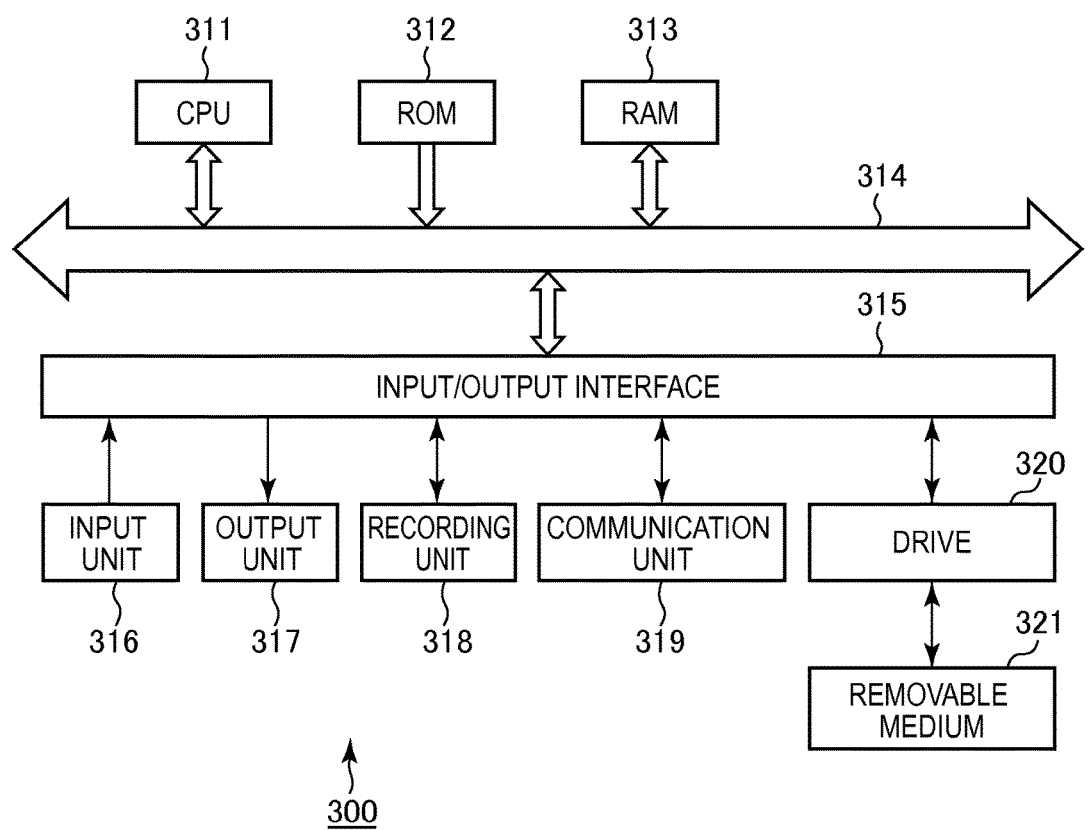

DISPLAY OF CONTENT BASED ON HANDWRITTEN INPUT

TECHNICAL FIELD

The present technology generally relates to information processing devices, information processing methods, and program storage media, and more particularly relates to an information processing device, an information processing method, and a program storage medium to be configured to improve work efficiency when creating figures.

BACKGROUND ART

Various techniques for recognizing handwritten characters and drawings which are input on a touch panel have recently been developed and commercially available in accordance with a spread of electronic devices having a display integrated with a touch panel, such as a tablet terminal as a typical example.

An example for recognizing the characters of handwritten input is a technique utilizing criteria characters which are provided in advance, whereby a handwritten character is recognized as an input character by best matching with the criteria characters.

The applicants have disclosed Patent Literature 1 as a technique to recognize handwritten characters. The Patent Literature 1 proposes an improvement in character recognition accuracy by utilizing a character recognition technology and utilizing such data as the number of strokes of the handwritten character and that of the criteria characters.

Meanwhile, spread sheet and presentation software programs having functions to create graphs and tables are also widely available. A graph is typically created in this type of software by entering numbers within a provided box using a mouse or a keyboard, issuing an instruction to create a graph, and then indicating a block which contains numbers to be reflected in the graph.

CITATION LIST

Patent Literature

Patent Literature 1 JP 1997-050490A

SUMMARY OF INVENTION

Technical Problem

Now, a user typically uses a finger or a pen-type input device (hereinafter called a pen for tablet) more often than a mouse or a keyboard for inputting to a tablet terminal device.

When the user creates a graph by using a finger or a pen for tablet in such a way as described before, intuitiveness in operation and work efficiency may deteriorate considerably if the user has to manipulate a software keyboard or icons, which are displayed on the screen of a display device, by using a finger or the pen for tablet.

Particularly, creating a graph involves a sophisticated thinking such as a trend analysis and also involves, in many cases, group work with others to discuss. Inefficiency in the operability of tablet terminals and similar devices may lower work efficiency in such work and may impact on work results. Thus, there is a need to improve the operability of the tablet terminals and similar devices.

The present technology has been developed, by taking these circumstances into account, to improve work efficiency in creating figures including graphs using an electronic device having a display unit which is integrated with a touch panel.

Solution to Problem

According to an aspect of the present technology, there is provided an information processing device including: an acquisition unit configured to acquire a content of a handwritten input on a touch panel; and a display control unit configured to control display of a shaped figure which is obtained by shaping a figure recognized from the handwritten input, according to the content of the handwritten input.

The display control unit may cause the shaped figure according to a parameter obtained through the handwritten input to be displayed.

The display control unit may cause the shaped figure which reflects a result of a computation of a predefined function executed based on the parameter to be displayed.

A figure to be shaped may be associated with the parameter by a line type used in the handwritten input.

The display control unit may cause a complemented figure which is obtained by complementing a figure recognized from the handwritten input, according to the parameter to be displayed.

The acquisition unit may acquire the content of the handwritten input on a screen for a handwritten input on the touch panel.

The display control unit may cause the content of the handwritten input before shaping to be redisplayed when there is issued an instruction for returning the display of the shaped figure to a condition before shaping.

A recognition unit configured to recognize the content of the handwritten input; and a shaping unit configured to shape the figure recognized from the handwritten input according to a recognition result from the recognition unit may be further included.

The information processing device may be an independent device or an internal block which constitutes a device.

An information processing method or a program storage medium according to an aspect of the present technology is an information processing method or a program storage medium which corresponds to the above-mentioned information processing device according to an aspect of the present technology.

In an information processing device, an information processing method, and a program storage medium according to an aspect of the present technology, a content of a handwritten input on a touch panel is acquired, and display of a shaped figure which is obtained by shaping a figure recognized from the handwritten input is controlled, according to the content of the handwritten input.

Advantageous Effects of Invention

According to an aspect of the present technology, work efficiency when creating figures can be improved.

BRIEF DESCRIPTION OF DRAWINGS

FIG. 6 shows an example of shaping and conversion of a graph.

FIG. 7 shows an example of shaping and conversion of a graph.

FIG. 15 shows a configuration example of computer.

DESCRIPTION OF EMBODIMENTS

Embodiments of the present technology will now be described with reference to the drawings.

<An External Appearance and a Configuration of a Tablet Terminal Device>

Figure 1:
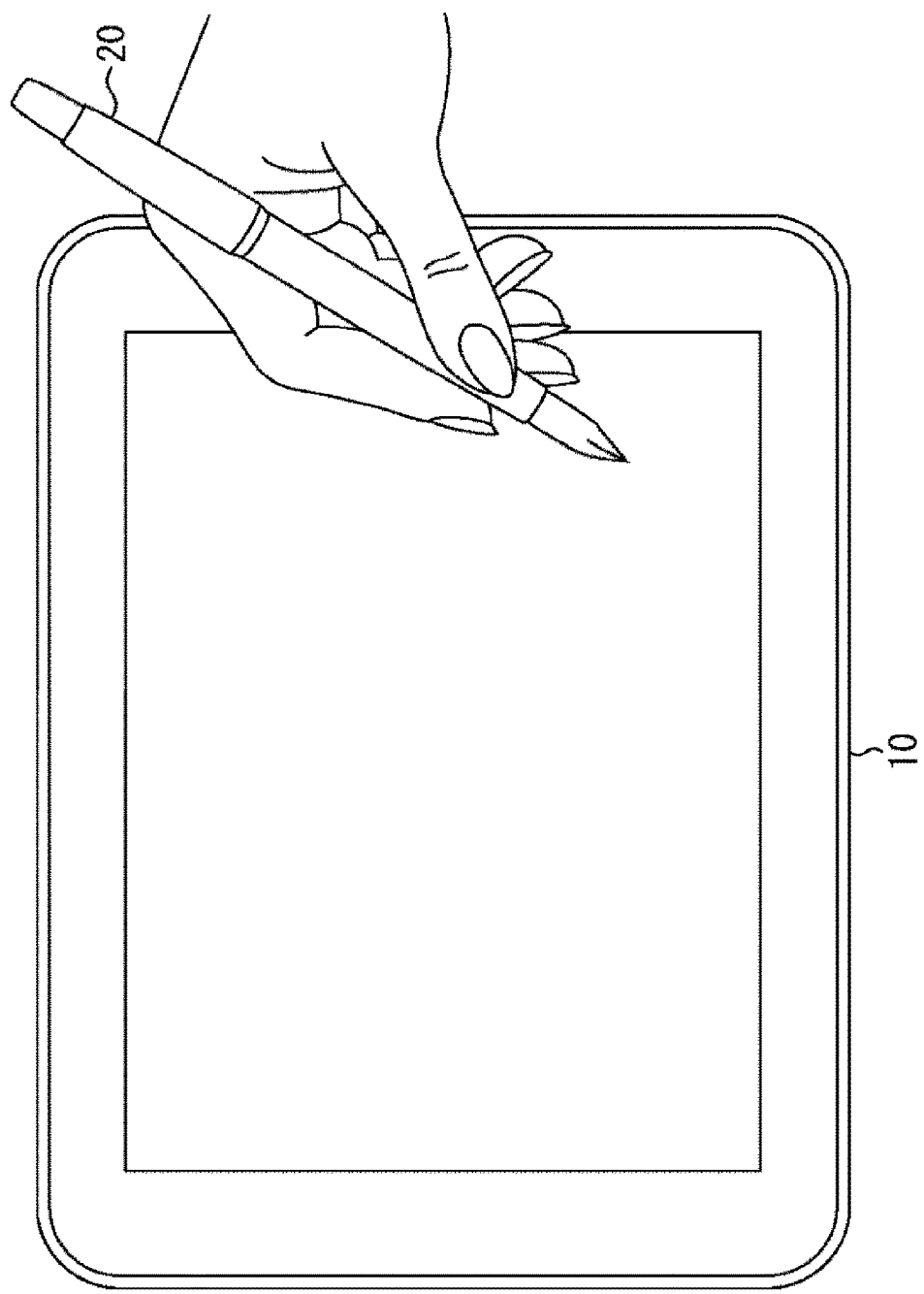
FIG. 1 shows an external appearance of a tablet terminal to which the present technology is applied.

FIG. 1 shows an external appearance of a tablet terminal to which the present technology is applied.

As shown in FIG. 1, a tablet terminal device 10 has a tabular case sized so as to be carried easily and used without depending on locations.

The tablet terminal device 10 also has, along with functions as a computer, a touch panel in which a touch sensor and a display unit are integrated. When handwritten input is performed with a user's finger or a pen for tablet 20, the tablet terminal device 10 executes various processes in accordance with a content of the handwritten input.

Figure 2:
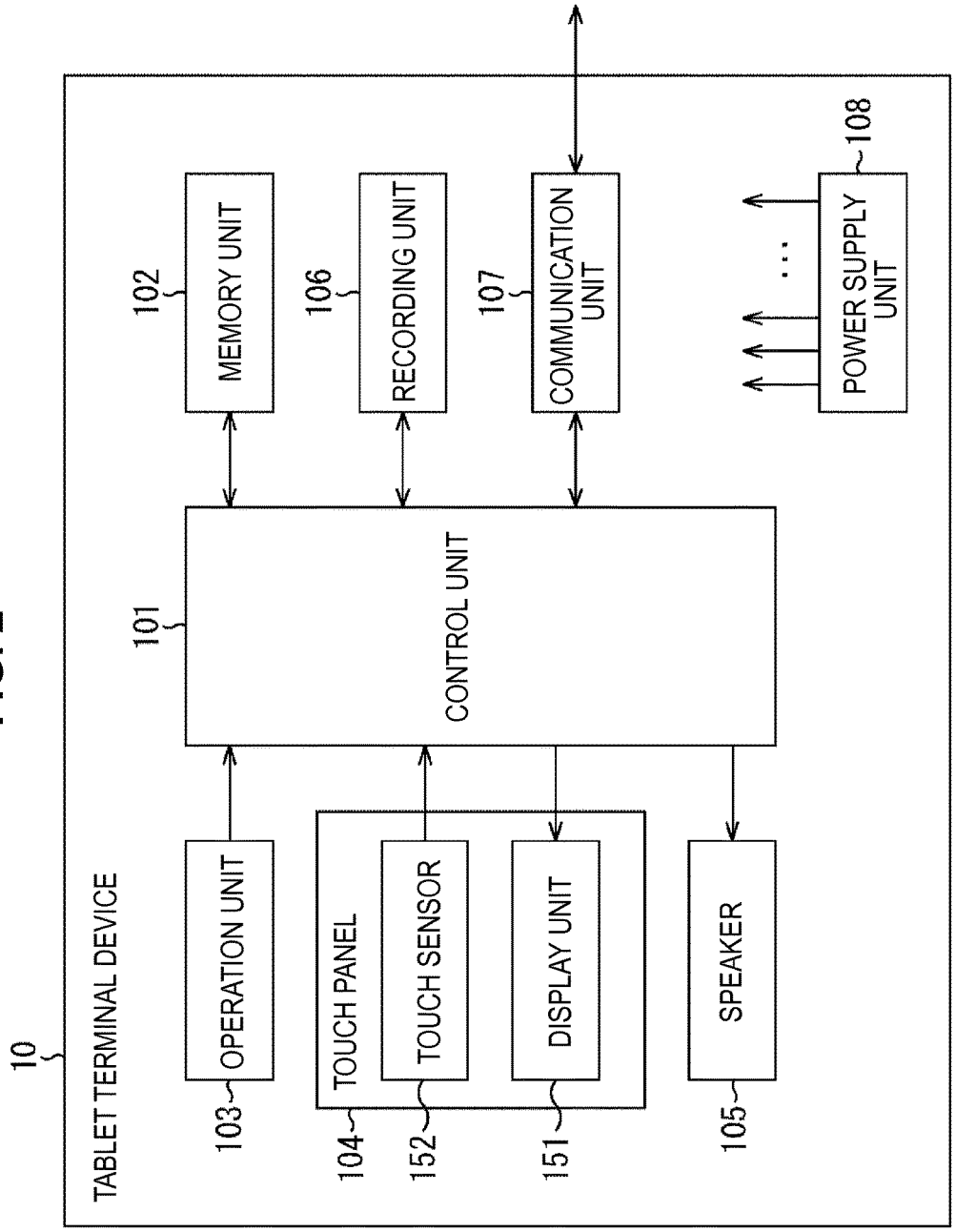
FIG. 2 shows an internal configuration of a tablet terminal device to which the present technology is applied.

FIG. 2 shows an internal configuration of a tablet terminal device to which the present technology is applied.

As shown in FIG. 2, the tablet terminal device 10 in FIG. 1 is configured to include a control unit 101, a memory unit 102, an operation unit 103, a touch panel 104, a speaker 105, a recording unit 106, a communication unit 107, and a power supply unit 108.

The control unit 101 controls the operation of each unit in the tablet terminal device 10. The memory unit 102 temporarily stores various data according to the control from the control unit 101.

The operation unit 103 includes a button which are disposed in the tablet terminal device 10 for supplying operational signals to the control unit 101 according to operation by a user. The control unit 101 controls the operation of each unit according to the operational signals from the operation unit 103.

The touch panel 104 includes the display unit 151 and the touch sensor 152 which is overlaid on the screen thereof. The display unit 151 includes a Liquid Crystal Display (LED) and other parts for displaying various kinds of information in accordance with the control from the control unit 101. In particular, the touch sensor 152 detects handwritten input operation, using the pen for tablet 20 and the like, onto the touch panel 104, and also detects the location on the touch panel 104 at which the operation is performed. The signals of the detection are supplied to the control unit 101.

The handwritten input operation detected by the touch sensor 152 as described above includes, for example, such operations as to make the pen for tablet 20 in contact with the surface of the touch panel 104, to move the pen for tablet 20 with the pen in contact with the surface of the touch panel 104, and to remove the pen for tablet 20 from the surface of the touch panel 104.

In addition, one of various detection methods such as, for example, an electromagnetic induction type or a capacitance type may be adopted for the touch panel 104.

The speaker 105 outputs sound according to the control from the control unit 101. The recording unit 106 is configured to have a Hard Disk Drive (HDD) for example. The recording unit 106 records various data according to the control from the control unit 101.

The communication unit 107 communicates with various servers (not shown) through a network according to the control from the control unit 101. The power supply unit 108 supplies the power obtained from a battery or an external power source to each unit including the control unit 101.

The tablet terminal device 10 is configured as described above.

<Functional Configuration of a Control Unit>

Figure 3:
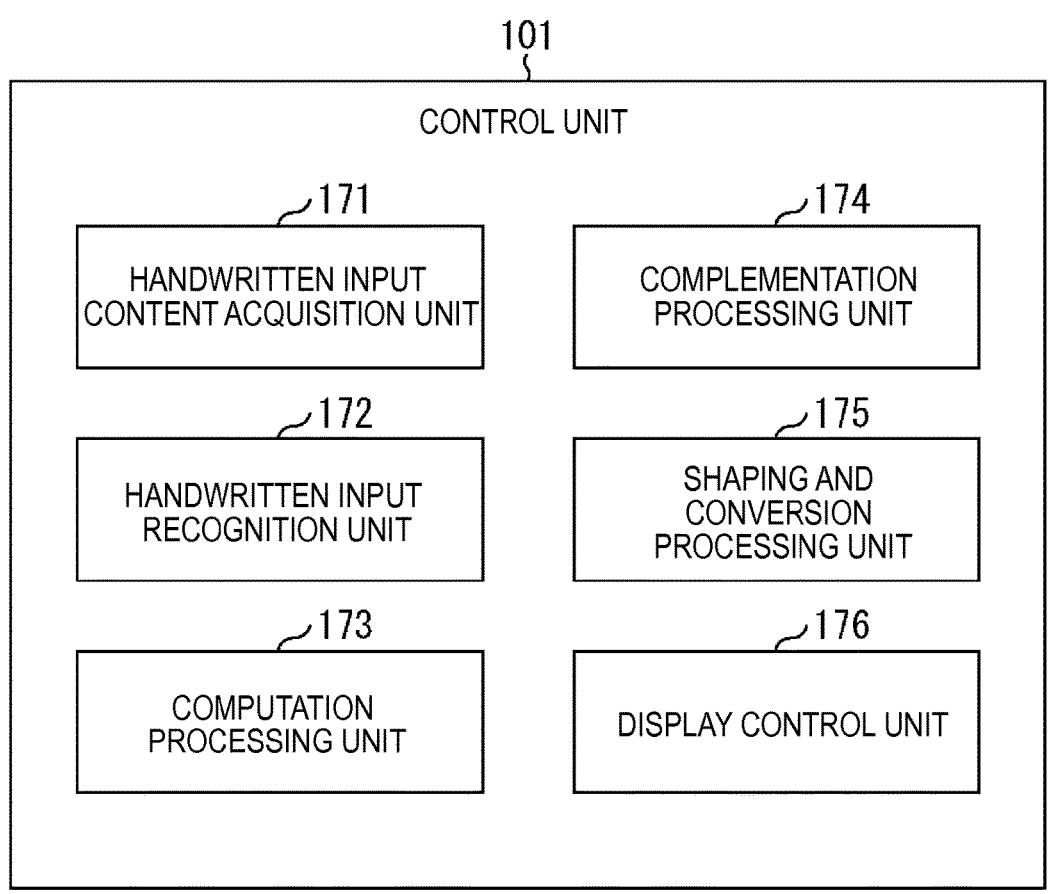
FIG. 3 shows a functional configuration example of a control unit.

FIG. 3 shows a functional configuration example of the control unit 101 in FIG. 2.

As shown in FIG. 3, a control unit 101 is configured to include a handwritten input content acquisition unit 171, a handwritten input recognition unit 172, a computation processing unit 173, a complementation processing unit 174, a shaping and conversion processing unit 175, and a display control unit 176.

The handwritten input content acquisition unit 171 acquires the content of a handwritten input on the touch panel 104 according to detection signals from the touch sensor 152, and supplies the content of the handwritten input to the handwritten input recognition unit 172.

The handwritten input recognition unit 172 recognizes the content of the handwritten input from the handwritten input content acquisition unit 171 and supplies the recognition results to the computation processing unit 173, the complementation processing unit 174, and the shaping and conversion processing unit 175.

The computation processing unit 173 performs a predefined computation process based on the recognition results from the handwritten input recognition unit 172, and supplies the computation results to the shaping and conversion processing unit 175 or the display control unit 176.

The complementation processing unit 174 performs a predefined complementation process based on the recognition results from the handwritten input recognition unit 172, and supplies the complementation results to the shaping and conversion processing unit 175.

The shaping and conversion processing unit 175 shapes the graph which is recognized from the handwritten input based on the recognition results from the handwritten input recognition unit 172, and supplies the shaped graph to the display control unit 176. In addition to the recognition results from the handwritten input recognition unit 172, if at least either of the computation results from the computation processing unit 173 or the complementation results from the complementation processing unit 174 is supplied, then the shaping and conversion processing unit 175 shapes, based on such results, the graph recognized from the handwritten input.

The display control unit 176 displays on the display unit 151 the shaped graph from the shaping and conversion processing unit 175. The display control unit 176 also displays on the display unit 151 the computation results from the computation processing unit 173.

The control unit 101 is configured as described above.

<Specific Examples of Usage>

Usages of a tablet terminal device 10 will now be described with reference to FIG. 4 to FIG. 13. Assumed here is a scene where a user uses a tablet terminal device 10 in answering questions after a presentation. A presentation software program is still running in the tablet terminal device 10 and a graph, which has already been explained in the presentation, is displayed on the touch panel 104. In such situation, the user is assumed to perform handwritten input using a pen for tablet 20 to the graph displayed on the touch panel 104.

(Usage Example 1)

Figure 4:
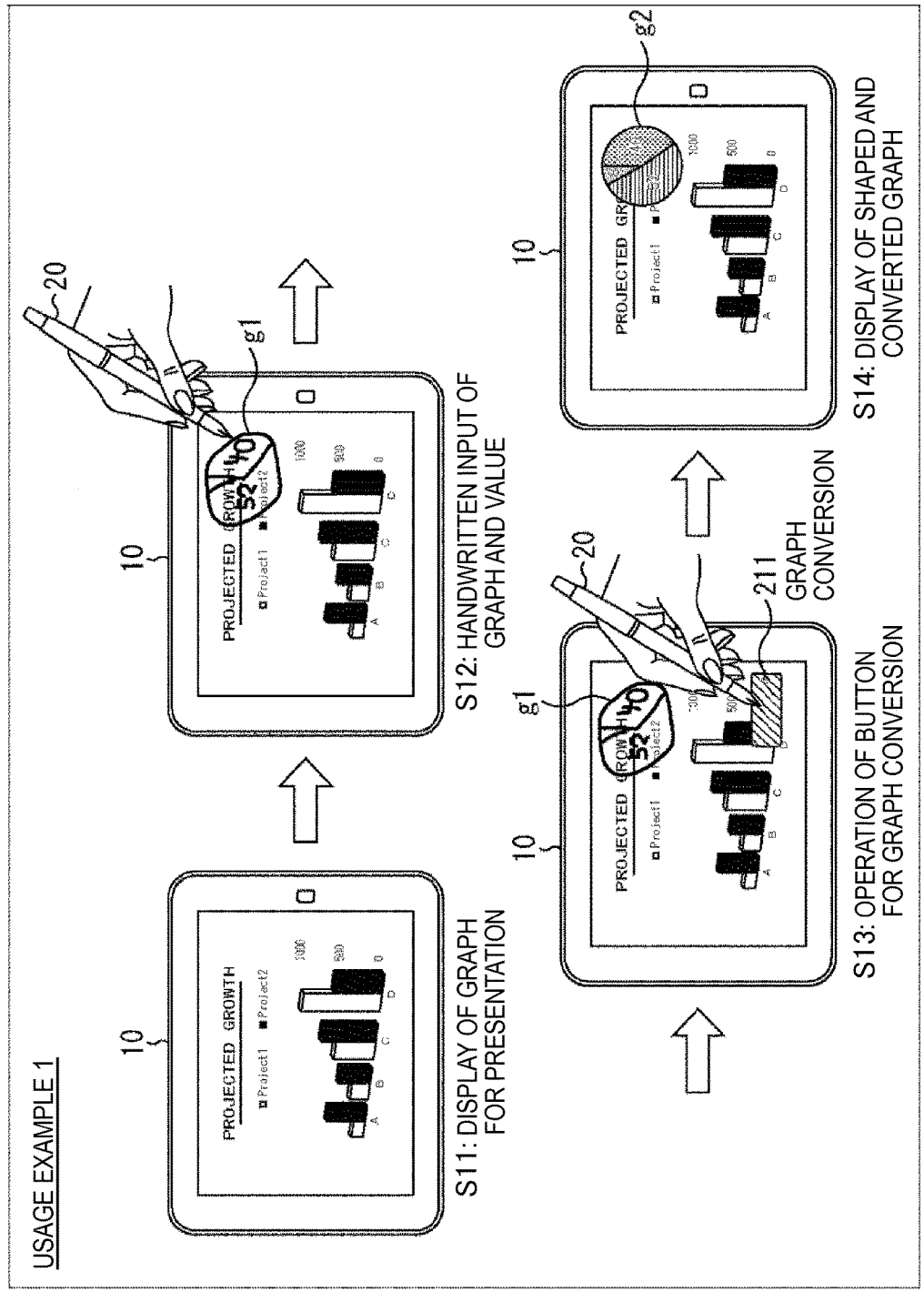
FIG. 4 is an illustration for explaining a usage example 1 of a tablet terminal device.

FIG. 4 is an illustration for explaining a usage example 1 of a tablet terminal device 10.

A tablet terminal device 10, in which a presentation software program is running, displays a graph which has been explained in a presentation (S11). In this setting, if a user inputs a handwritten pie chart using a pen for tablet 20, a graph g1 is displayed on a touch panel 104 according to the handwritten input (S12).

This graph g1 is made of three sectors. This graph, however, is not a perfect circle because of the handwritten input using the pen for tablet 20 and the circular arc of each sector is not proportional to the numbers the user input, either. In this case, a ratio of "40" has been input for a first sector and a ratio of "52" for a second sector, whereas no number has been input for the remaining sector. It is expected that a ratio of "8" should be input for the remaining sector because of the relation to the numbers input for the other sectors. Moreover, the lengths of the circular arcs by handwritten input are not proportional to corresponding ratios of those numbers.

Now, if a predefined operation is performed to the tablet terminal device 10, a button 211 for instructing shaping and conversion of the handwritten graph is displayed on the touch panel 104. The user uses the pen for tablet 20 to operate the button 211 on the touch panel 104 (S13).

When the button 211 is operated, the tablet terminal device 10 performs a recognition process of handwritten inputs such as numbers and graphs, and executes a computation process according to the numbers, and then the handwritten graph g1 is shaped and converted. By this operation, the touch panel 104 (S14) displays a graph g2 which is obtained by shaping and conversion of the handwritten graph g1.

Now, the graph g2 obtained after shaping and conversion has a perfect circle and the length of each arc is proportional to the number input for the sector. Moreover, "40" and "52" are displayed in the first and the second sectors respectively, in the graph g1 of the handwritten input, and "8" is also complemented and displayed in the remaining sector.

As described in usage example 1 above, inputting a handwritten pie chart on the touch panel 104 allows to display the pie chart which is obtained from shaping and conversion of the handwritten graph. Moreover, if parameter numbers are not fully provided, the missing number is complemented and the shaped and converted pie chart is displayed. In other words, the only thing for the user to do is to input a handwritten rough graph so that the tablet terminal device 10 will display a refined graph. Consequently this allows the user to improve work efficiency in making a graph.

(Usage Example 2)

Figure 5:
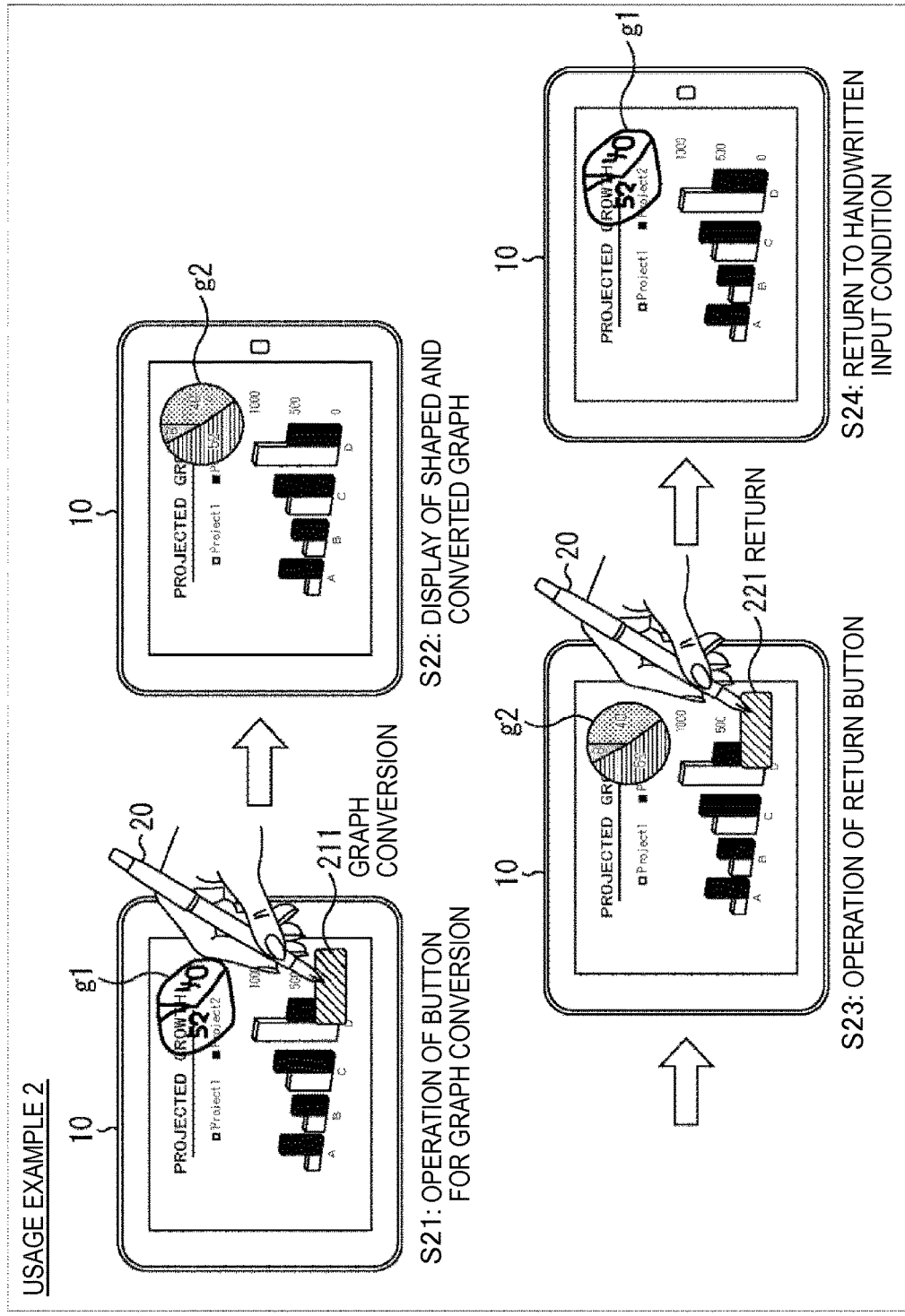
FIG. 5 is an illustration for explaining a usage example 2 of a tablet terminal device.

FIG. 5 is an illustration for explaining a usage example 2 of a tablet terminal device 10.

With reference to S21 and S22 of the usage example 2 in FIG. 5, a graph g2 obtained after the shaping and conversion of the handwritten graph g1 is displayed (S22) by operating the button 211 (S21), which are the same as in S13 and S14 of the usage example 1 in FIG. 4.

When the user performs a predefined operation to the tablet terminal device 10, a button 221 for returning the shaped and converted graph to the original handwritten input is displayed on the touch panel 104. The user operates the button 221 on the touch panel 104 by using the pen for tablet 20 (S23).

When the button 221 is operated, the tablet terminal device 10 displays again the graph g1 instead of the graph g2 (S24). More particularly, the data of the graph g1, which has temporally been stored in a memory unit 102, is called up and displayed again on the touch panel 104 if the button 221 is operated.

As explained with the usage example 2, the display of the pie chart is allowed, by operating the button 221, to return from the condition after the shaping and conversion to that of the handwritten input. In other words, if the user, for example, finds an error in the graph and wants to modify it after the graph g2 is displayed, the user can redisplay the graph g1 and perform handwritten input to the graph again. If the user wants to shape and convert the modified handwritten pie chart, then the user can operate the button 211 again. Consequently, accuracy in graph making can be improved with the tablet terminal device 10.

Aforementioned operations can thus be summarized as follows: As shown in FIG. 6 and as explained with the usage examples 1 and 2, the user can display a refined graph g4 by inputting a graph g3 only roughly by hand. Moreover, the user can modify the handwritten graph g3, which has once been refined, by returning the displayed image on the touch panel 104 from the refined graph g4 to the handwritten graph g3.

It is expected at a presentation site that a plural number of people participate in discussion and collaborate to make graphs. In this situation, the operability of the tablet terminal device 10 plays an important role. As explained with the usage examples 1 and 2, the refined pie chart can be displayed and modified from a rough handwritten input with a simple operation on the tablet terminal device 10, which allows to improve work efficiency in graph making. As a result, this allows to make the communication smoother at the presentation. Moreover, graphs can be made by using the pen for tablet 20, instead of manipulating a software keyboard or icons, which can enhance intuitiveness in operation.

The usage examples 1 and 2 have been explained using a pie chart by way of example. The shaping and conversion operation is not limited to pie charts alone but is applicable to other types of graphs. More particularly, if a bar chart g5 made of 3 bars is written by hand on the touch panel 104 as shown in FIG. 7, for example, a refined graph g6 can be displayed by operating the button 211. Again, the graph g5, which has once been refined, can be modified in the same way as explained with the pie chart in the previous discussion.

(Usage Example 3)

Figure 8:
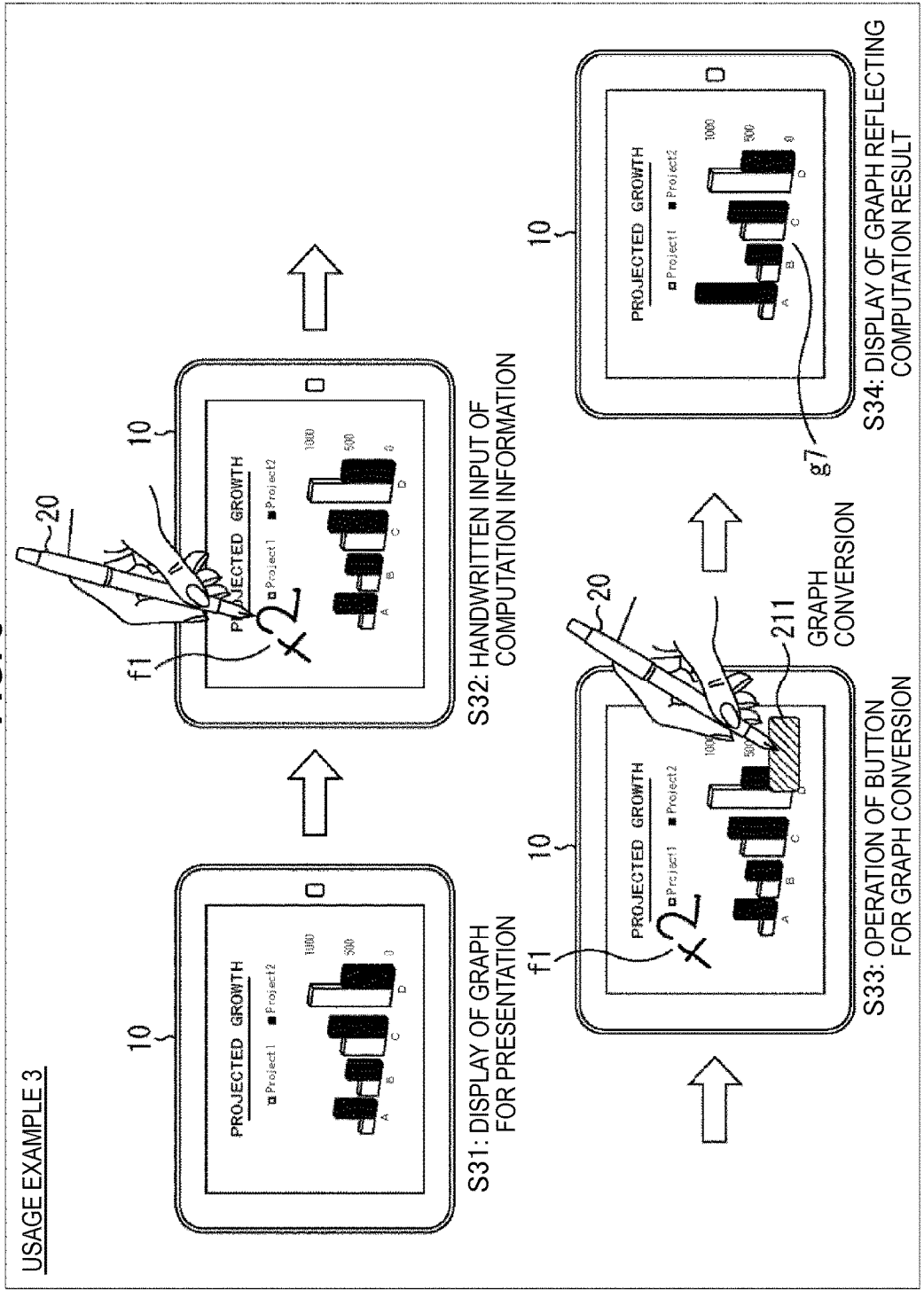
FIG. 8 is an illustration for explaining a usage example 3 of a tablet terminal device.

FIG. 8 is an illustration for explaining a usage example 3 of a tablet terminal device 10.

A presentation software program is running in a tablet terminal device 10 and a graph, which has already been explained in the presentation, is still displayed (S31).

In this condition, if a user writes "×2" by hand using a pen for tablet 20 in a predefined area above the second bar from the left in an eight-bar chart displayed on a touch panel 104, then computation information f1 is displayed on the touch panel 104 (S32) according to the handwritten input. The computation information here includes, for example, a function such as an operator and a parameter thereof. The user may only specify the parameter in case the function is preset.

Now, when the user performs a predefined operation to the tablet terminal device 10, a button 211 for instructing shaping and conversion to the graph is displayed on the touch panel 104. The user uses the pen for tablet 20 to operate the button 211 on the touch panel 104 (S33).

When the button 211 is operated, the tablet terminal device 10 performs a computation process according to the handwritten computation information and the computation result is reflected to the graph. More particularly, the user write "×2" by hand in an area above the second bar from the left so that the computation that the value for the second bar from the left is multiplied by 2 is performed and the graph is shaped and converted according to the computation result. By this operation, a graph g7 reflecting the computation result is displayed on the touch panel 104 (S34).

Figure 9:
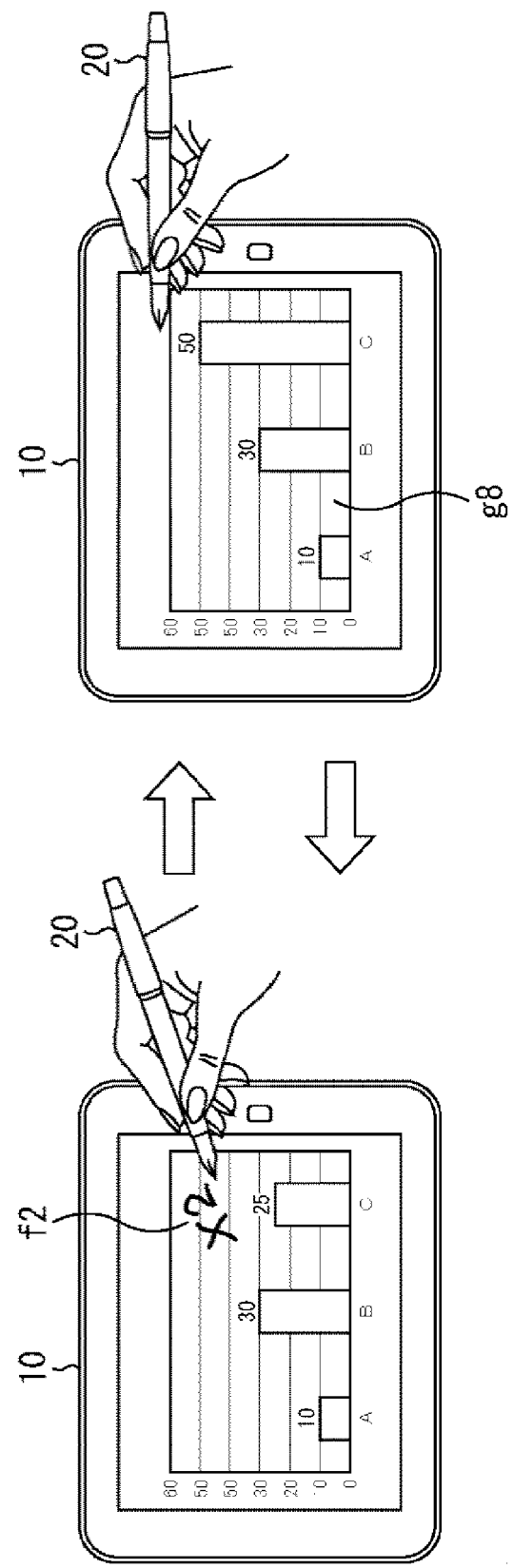
FIG. 9 shows an example of shaping and conversion of a graph.

FIG. 9 shows an example in which "×2" is written by hand in a predefined area above the rightmost bar in a three-bar chart displayed on the touch panel 104. In this case, displayed is a graph g8 in which the value for the rightmost bar has been doubled, i.e., increased from 25 to 50, according to the computation information f2.

As described in the usage example 3, the only thing for the user to do is to input on the touch panel 104 handwritten computation information for obtaining a desired computation result ("×2" for example) so that the graph reflecting the computation results can be displayed. Consequently, this can improve work efficiency in graph making.

Figure 10:
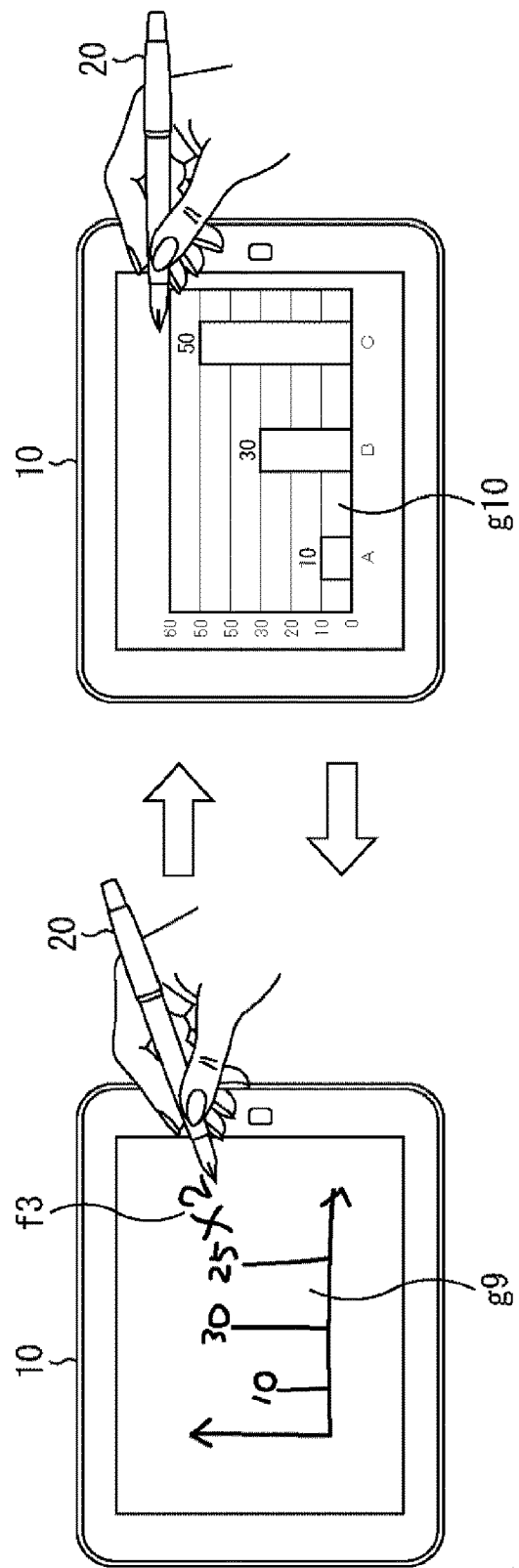
FIG. 10 shows an example of shaping and conversion of a graph.

According to the explanation related to the usage example 3, the computation result has been reflected to the graph which was prepared in advance. The computation result, however, may be reflected to a handwritten bar chart. More particularly, as shown in FIG. 10, if a graph g9 made of three bars is written by hand and the user write "×2" by hand in a predefined area above the rightmost bar, then the computation is performed so that the value for the rightmost bar is multiplied by 2 according to the computation information f3. With this operation, the computation result is reflected to the graph g10 after shaping and conversion so that the value for the rightmost bar increases from 25 to 50.

(Usage Example 4)

Figure 11:
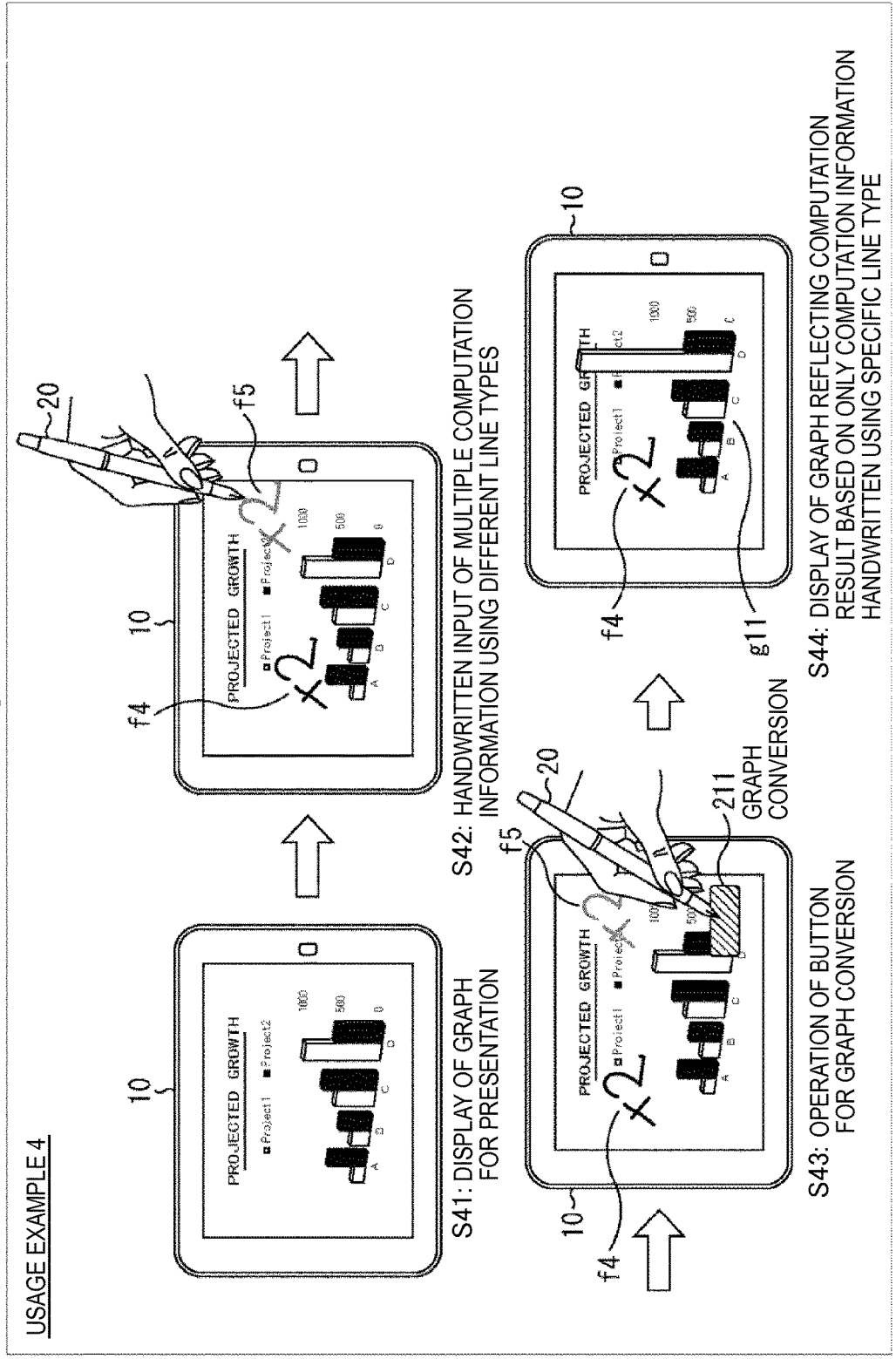
FIG. 11 is an illustration for explaining a usage example 4 of a tablet terminal device.

FIG. 11 is an illustration for explaining a usage example 4 of a tablet terminal device 10.

A presentation software program is running in a tablet terminal device 10 and a graph, which has been explained in the presentation, is still displayed (S41).

In this condition, if a user writes "×2" by hand with a pen for tablet 20, using a first line type, in a predefined area above the second bar from the left in an eight-bar chart displayed on a touch panel 104, then computation information f4 is displayed on the touch panel 104 according to the handwritten input. Meanwhile, if the user writes "×2" by hand, using a second line type, in a predefined area above the seventh bar from the left in the eight-bar chart, then computation information f5 is displayed on the touch panel 104 (S42) according to the handwritten input. In this case, a different line type is used for each line, for example, a black line for the first line type and a red line for the second line type.

Now, when the user performs a predefined operation to the tablet terminal device 10, a button 211 for instructing shaping and conversion to the graph is displayed on the touch panel 104. The user uses the pen for tablet 20 to operate the button 211 on the touch panel 104 (S43).

When the button 211 is operated, the tablet terminal device 10 performs a computation process according to the handwritten computation information using a specific line type, among a plural number of pieces of computation information, and the computation result is reflected to the graph. In particular, if a red line is selected as the specific line type, the value of the seventh bar from the left is computed to be made double according to the computation information f5 because "×2" is written in red by hand in the predefined area above the seventh bar from the left. The graph is then shaped and converted according to the computation result. By this operation, a graph g11 reflecting the computation result is displayed on the touch panel 104 (S44).

The specific line type here is not limited to line color, but may include, for example, line thickness, line texture such as a solid or a broken line, or any line type which can specify an object to be computed in relation to the graph and the computation information. Moreover, the line types may be set in a predefined setting screen and may be changed at user's discretion.

As described in the usage example 4, the only thing for the user to do is to write computation information by hand on the touch panel 104, using a specific line type (a red line for example), for obtaining a desired computation result ("×2" for example) so that the graph reflecting the computation results can be displayed. Consequently this improves work efficiency in making graphs.

(Usage Example 5)

Figure 12:
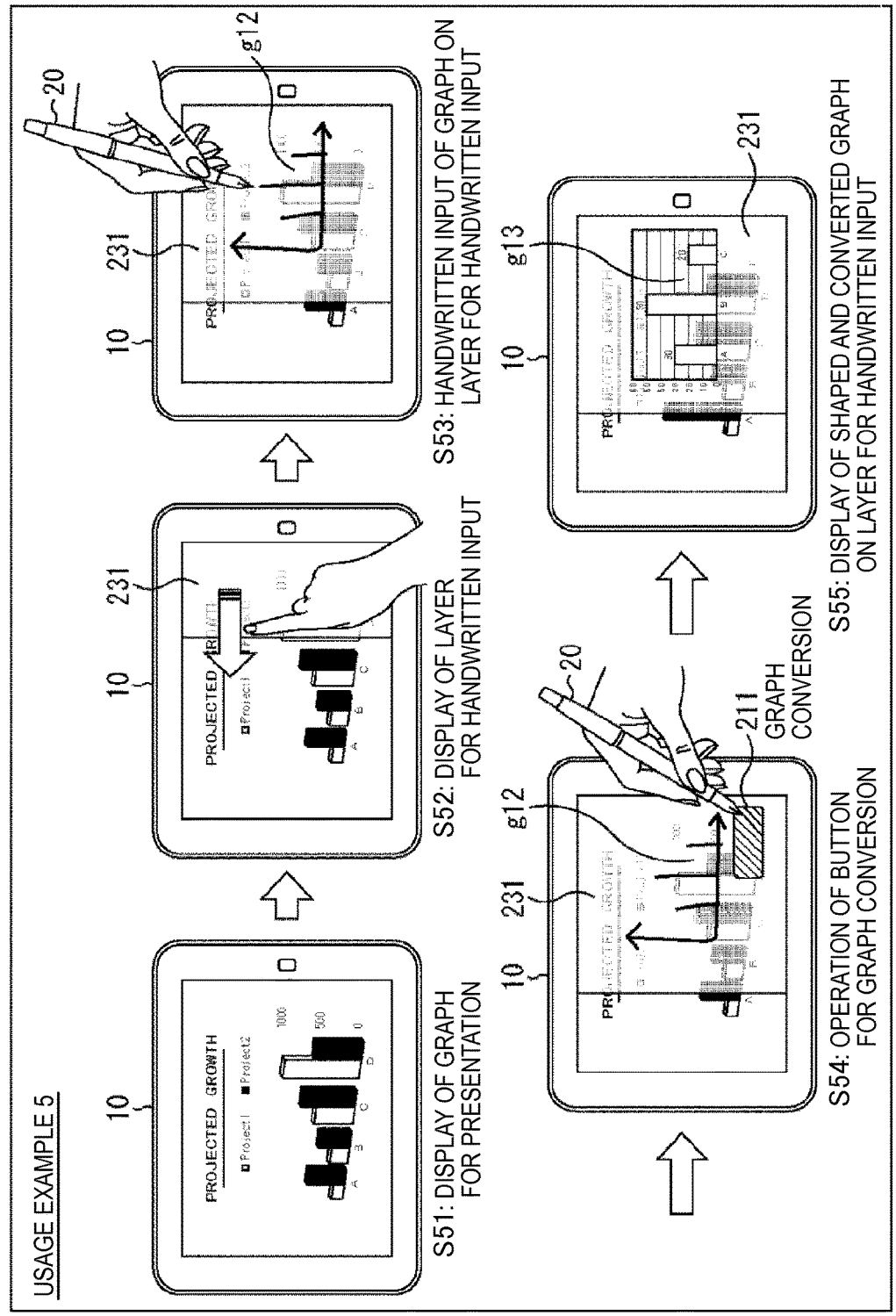
FIG. 12 is an illustration for explaining a usage example 5 of a tablet terminal device.

FIG. 12 is an illustration for explaining a usage example 5 of a tablet terminal device 10.

A tablet terminal device 10, in which a presentation software program is running, displays a graph which has been explained in a presentation (S51).

In this setting, if a user perform a flicking operation on the touch panel 104, a layer 231 for handwritten input is displayed (S52). The layer 231 for handwritten input here, on which a user can input handwritten graphs or the like, is semitransparent and superimposed over a part of a graph for presentation. The flicking operation here refers to an operation whereby a user put a finger on a desired area on the touch panel 104 and slide the finger to a desired direction. With reference to FIG. 12, a user is sliding a finger leftward on the touch panel 104, which makes a left-flick operation.

In this setting, if the user input a handwritten bar chart made of X and Y axes and three bars on the layer 231 using a pen for tablet 20, a graph g12 is displayed on the touch panel 104 according to the handwritten input (S53).

Now, when the user performs a predefined operation to the tablet terminal device 10, a button 211 for instructing shaping and conversion of the handwritten graph is displayed on the touch panel 104. The user operates the button 211 on the touch panel 104 by using a pen for tablet 20 (S54).

When the button 211 is operated, the tablet terminal device 10 performs a recognition process for handwritten inputs including numbers and a graph and executes a computation process according to the numbers, and then the handwritten graph g12 is shaped and converted. By this operation, a graph g13 obtained by shaping and conversion of the handwritten graph g12 is displayed on the layer 231 on the touch panel 104.

As described in the usage example 5, inputting a handwritten graph on the layer 231 on the touch panel 104 allows to display a shaped and converted graph on the layer 231. In other words, if the user wants to make a new graph, the only thing for the user to do is to have the layer 231 displayed and input a rough handwritten graph on the layer 231 so that the tablet terminal device 10 will display a refined graph. This allows to improve work efficiency in making graphs. Moreover, even if there is no space for displaying the graph on the touch panel 104, the layer 231 allows the user to securely input a handwritten graph and to display the refined graph.

In addition, the layer 231 may have a predefined transparency as shown in FIG. 12 or may not be transparent so that the graph displayed on a lower layer under the layer 231 will not be visible. In this case, the handwritten graph is only displayed on the layer 231.

(Other Usage Examples)

Figure 13:
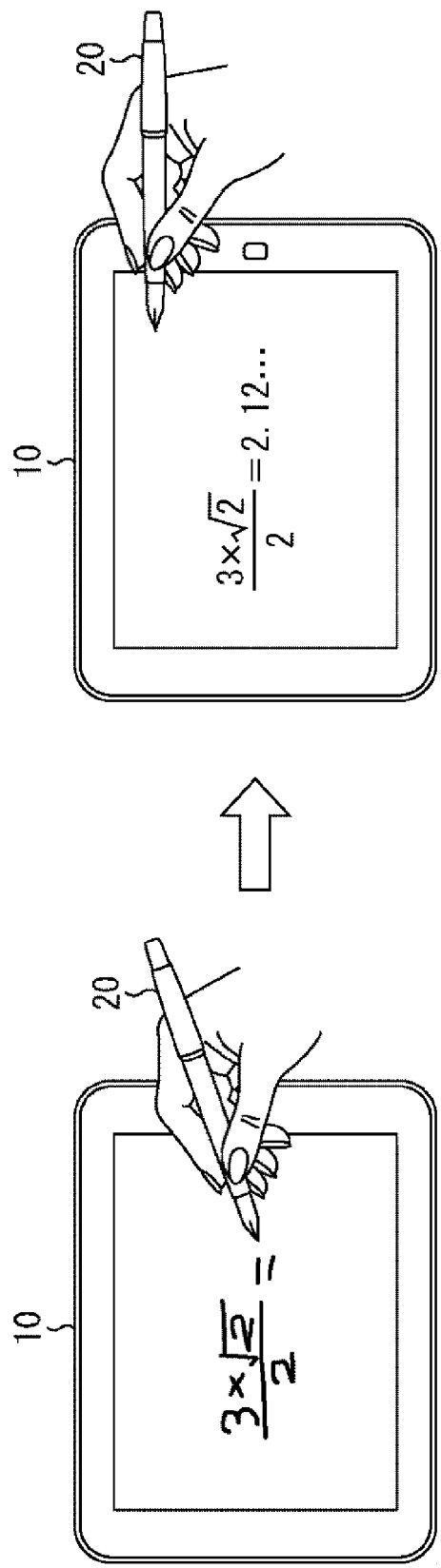
FIG. 13 is an illustration for explaining other usage examples.

In the usage examples described above, graphs have been focused on for explaining shaping and conversion. As shown in FIG. 13, however, if a desired arithmetic expression is written by hand, the computation results from the arithmetic expression may be displayed. For example, if "3×√2/2" is written by hand, then a computation result of 2.12 . . . together with the expression will be displayed in a fair copy state.

It is noted that although a software program for presentation is used, by way of example, as the software for making graphs that the tablet terminal device 10 is executing in the above-described usage examples, other software programs such as a spreadsheet capable of making graphs.

<Handwritten Input Shaping and Conversion Process>

Referring now to a flowchart in FIG. 14, a shaping and conversion process for a handwritten input which the control unit 101 in FIG. 3 performs will be explained.

In step S111, the handwritten input content acquisition unit 171 determines, based on detection signals from the touch sensor 152, whether or not handwritten input on the touch panel 104 has started with using the pen for tablet 20. It is noted that the handwritten input may be performed on the handwritten input layer 231 as shown in the usage example 5 in FIG. 12. In any case, the process will proceed to step S112 only after the handwritten input is started.

In step S112, the handwritten input content acquisition unit 171 acquires the content of a handwritten input based on the detection signals from the touch sensor 152.

In step S113, the handwritten input content acquisition unit 171 determines, based on the detection signals from the touch sensor 152, whether or not handwritten input on the touch panel 104 using the pen for tablet 20 has been completed.

In step S113, if the handwritten input is determined not to be completed, the process will return to step S112 and repeat the steps thereafter. In other words, the handwritten input content acquisition unit 171 will continue to acquire the content of the handwritten input when the handwritten input is started until the handwritten input is completed. When the handwritten input is completed, the process will proceed to step S114.

In step S114, the control unit 101 determines, based on the detection signals from the touch sensor 152, whether or not the button 211 for instructing shaping and conversion of a handwritten graph has been operated.

In step S114, if the button 211 is not operated, the process will return to step S111 for further handwritten inputs and repeat the steps thereafter. It is noted that the handwritten input data acquired by the handwritten input content acquisition unit 171 is stored in the memory unit 102 so that the handwritten input data, as described in the usage example 2 in FIG. 5, can be redisplayed by operating the button 221 if so instructed. In step S114, if the button 211 is determined to be operated, the process will proceed to step S115.

It is noted that the determination criteria in step S114 is not limited to the operation of the button 211 displayed on the touch panel 104. Any predefined operation to the tablet terminal device 10 may cause to instruct shaping and conversion of the handwritten graph.

In step S115, the handwritten input recognition unit 172 recognizes the content of the handwritten input acquired by the handwritten input content acquisition unit 171.

The recognition process of the handwritten input content here includes, for example, such processes as to distinguish characters from graphs, to recognize individual figures, and to recognize a figure including multiple figures. For example, a handwritten figure is mapped in a feature parameter space together with teacher-data figures which are given in advance, and a teacher-data figure best-matched with the handwritten figure is returned as the recognition result. The feature quantities which are generally used here include angles of a line at the starting and the end points and the distance between the starting and the end points as well as a total length of strokes of an input handwriting (see Non-Patent Literature 1 for example).

Non-Patent Literature 1 Rubine Algorithm, Rubine, D.: Specifying Gestures by Example, In Proc. Of ACM SIGGRAPH '91 (1991), pp. 329-337.

Other known techniques including, for example, a method to use pattern recognition (see JP H7-107708B for example) and a method to calculate the distribution of histogram of angles (see JP 3046472B for example) may be used for recognizing handwritten input contents.

In step S116 the handwritten input recognition unit 172 determines, based on the recognition result of step S115, whether or not the handwritten input content contains a graph. In step S116, if the handwritten input content is determined to contain a graph, the process will proceed to step S117.

In step S117, the computation processing unit 173 determines, based on the recognition result of step S115, whether or not the handwritten input content contains computation information. In step S117, if any computation information such as a function and parameters thereof ("×2" for example) is determined to be contained, the process will proceed to step S118.

In step S118, the computation processing unit 173 performs a predefined computation process based on the handwritten computation information. For example, if "×2" is input in a predefined area on the touch panel 104, as shown in the usage example 3 in FIG. 8, the computation is performed to double the value of a target bar in a bar chart.

It is noted that if a plurality of "×2" are written by hand with a plurality of line types, as shown in the usage example 4 in FIG. 4, the handwritten input using a preset specific line type (a red line for example) will only be adopted.

When the computation process in step S118 is completed, the process will proceed to step S119. On the other hand, the handwritten input content is determined not to contain any computation information in step S117, the process will skip the computation process in step S118 and proceed to step S119.

In step S119, the complementation processing unit 174 determines, based on the result of step S115, whether or not it is possible to complement the handwritten graph. In step S119, if it is determined possible to complement the graph, the process will proceed to step S120.

In step S120, the complementation processing unit 174 performs a predefined complementation process to the handwritten graph. For example, if there exist a sector without having a ratio input among sectors of a handwritten pie chart, as shown in the usage example 1 in FIG. 4, an ratio expected to be input in the sector will be complemented ("8" for example).

When the complementation process is completed in step S120, the process will proceed to step S121. On the other hand, the complementation is determined not possible in step S119, the process will skip the complementation process in step S120 and proceed to step S121.

In step S121, the shaping and conversion processing unit 175 determines, based on the recognition result in step S115, whether or not it is possible to perform shaping on the handwritten graph. In step S121, if the handwritten graph is determined possible to be shaped, the process will proceed to step S122.

In step S122, the shaping and conversion processing unit 175 performs a predefined shaping and conversion process on the handwritten graph. For example, if a handwritten pie chart is not a perfect circle and each circular arc is not proportional to a ratio of an input value, as shown in FIG. 4, the pie chart will be shaped and converted into the one having a perfect circle in which each circular arc is proportional to the ratio of the input value for the sector.

When the shaping and conversion process in step S122 is completed, the process will proceed to step S123. On the other hand, if the shaping is determined not possible to the graph in step S121, the process will skip the shaping and conversion process in step S122 and proceed to step S123.

In step S123, the display control unit 176 displays on the display unit 151 the graph which has been modified through various processes in display unit 151. In other words, the graph displayed is a processed graph at least either by the computation process in step S118, by the complementation process in step S120, or by the shaping and conversion process in step S122.

Consequently, displayed on the display unit 151 will be such graphs as, for example, a graph after shaping and conversion as in the usage example 1 (S14 in FIG. 4), a graph reflecting computation results as in the usage example 3 (S34 in FIG. 8), a graph reflecting computation results corresponding to only computation information handwritten using a specific line type as in the usage example 4 (S44 in FIG. 11), or a shaped and converted graph displayed on the handwritten input layer 231 as in the usage example 5 (S55 in FIG. 12)

It is noted that as shown in the usage example 2 in FIG. 5, if the button 221 for returning to the original handwritten graph is operated while displaying a graph on which the shaping and conversion process or the like has been performed, the display control unit 176 will read the handwritten input data stored in the memory unit 102 and redisplay the graph in a handwritten condition on the display unit 151.

On the other hand, if the handwritten input is determined not to contain a graph in step S116, the process will proceed to step S124. In step S124, the computation processing unit 173 determines whether or not the handwritten input contains any computation information. In step S124, if the handwritten input is determined to contain computation information, the process will proceed to step S125.

In step S125, the computation processing unit 173 performs a predefined computation process based on the handwritten computation information. When the computation process is completed in step S125, the process will proceed to step S123.

In step S123, the display control unit 176 displays the result of the computation process in step S125 on the display unit 151. The computation result as shown in FIG. 13 is thereby displayed on the touch panel 104. If the handwritten input is determined not to contain any computation information in step S124, the process will return to step S111 and repeat the steps thereafter.

Figure 14:
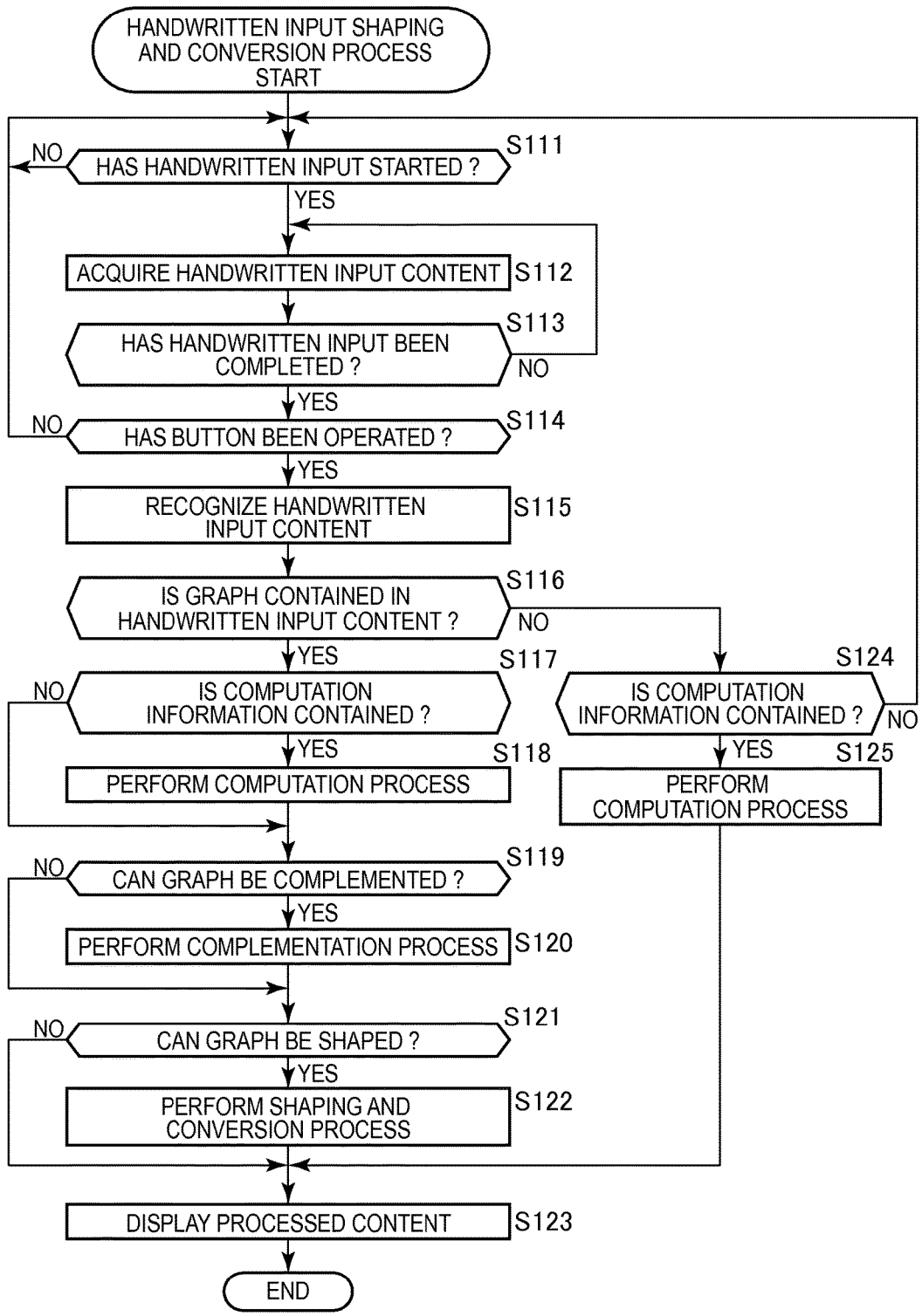
FIG. 14 is a flowchart for explaining a shaping and conversion process for a handwritten input.

The handwritten input shaping and conversion process shown in FIG. 14 has been explained above.

It is noted that a predetermined server on a network (not shown) may perform at least one of the processes that the control unit 101 performs, such as processes performed by the handwritten input recognition unit 172, the computation processing unit 173, the complementation processing unit 174, and the shaping and conversion processing unit 175, and then the control unit 101 may obtain the processed results from the server.

As described above, when the handwritten input is performed, the handwritten input shaping and conversion process performs at least either of the computation process in step S118, the complementation process in step S120, or the shaping and conversion process in step S122, which allows to improve work efficiency in graph making.

Although pie charts and bar charts have been used by way of example in the previous explanation, objects to be processed may be other charts including column-, cone-, or pyramid-type vertical bar charts, horizontal bar charts, line graphs, area charts, scatter diagrams, candlestick charts, bubble charts, contour charts, doughnut charts, radar charts. In addition, although numbers and operators are used as parameters by way of example to refine the figures such as graphs, the parameters may include characters, symbols or combinations thereof, for example.

Moreover, although a tablet terminal device is explained by way of example in the previous explanation, the present technology is not limited to be applicable to the tablet terminal device, but is applicable to other electronic devices having a touch panel, such as personal computers.

<Configuration Example of Computer to which Present Technology is Applied>

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 15 is a block diagram showing a hardware configuration example of a computer that performs the above-described series of processing using a program.

In the computer 300, a central processing unit (CPU) 311, a read only memory (ROM) 312 and a random access memory (RAM) 313 are mutually connected by a bus 314.

An input/output interface 315 is also connected to the bus 314. An input unit 316, an output unit 317, a recording unit 318, a communication unit 319, and a drive 320 are connected to the input/output interface 315.

The input unit 316 is configured from a keyboard, a mouse, a microphone or the like. The output unit 317 is configured from a display, a speaker or the like. The recording unit 318 is configured from a hard disk, a non-volatile memory or the like. The communication unit 319 is configured from a network interface or the like. The drive 320 drives a removable medium 321 such as a magnetic disk, an optical disk, a magneto-optical disk, a semiconductor memory or the like.

In the computer 300 configured as described above, the CPU 311 loads a program that is stored, for example, in the recording unit 318 onto the RAM 313 via the input/output interface 315 and the bus 314, and executes the program. Thus, the above-described series of processing is performed.

Programs to be executed by the computer 300 (the CPU 311) are provided being recorded in the removable medium 321 which is a packaged medium or the like. Also, programs may be provided via a wired or wireless transmission medium, such as a local area network, the Internet or digital satellite broadcasting.

In the computer 300, by loading the removable medium 321 into the drive 320, the program can be installed into the recording unit 318 via the input/output interface 315. It is also possible to receive the program from a wired or wireless transfer medium using the communication unit 319 and install the program into the recording unit 318. As another alternative, the program can be installed in advance into the ROM 312 or the recording unit 318.

It should be noted that the program executed by the computer 300 may be a program that is processed in time series according to the sequence described in this specification or a program that is processed in parallel or at necessary timing such as upon calling.

Here, in the present specification, processing steps that describe the program causing the computer 300 to execute various processes may not necessarily be processed in time series in the order prescribed as a flowchart, but include processes (for example, parallel processes or processes by objects) performed in parallel or individually.

The program may be a program executed by a single computer or may be a program executed in a distribution manner by a plurality of computers. The program may be transmitted remotely to a computer to be executed.

Further, in the present specification, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the technology is not limited to the embodiments described above, and various changes and modifications may be made without departing from the scope of the technology.

For example, the present technology can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1)
An information processing device including:
an acquisition unit configured to acquire a content of a handwritten input on a touch panel; and
a display control unit configured to control display of a shaped figure which is obtained by shaping a figure recognized from the handwritten input, according to the content of the handwritten input.

(2)
The information processing device according to (1), wherein the display control unit causes the shaped figure according to a parameter obtained through the handwritten input to be displayed.

(3)
The information processing device according to (2), wherein the display control unit causes the shaped figure which reflects a result of a computation of a predefined function executed based on the parameter to be displayed.

(4)
The information processing device according to (3), wherein a figure to be shaped is associated with the parameter by a line type used in the handwritten input.

(5)
The information processing device according to (2), wherein the display control unit causes a complemented figure which is obtained by complementing a figure recognized from the handwritten input, according to the parameter to be displayed.

(6)
The information processing device according to any one of (1) to (5), wherein the acquisition unit acquires the content of the handwritten input on a screen for a handwritten input on the touch panel.

(7)
The information processing device according to any one of (1) to (6), wherein the display control unit causes the content of the handwritten input before shaping to be redisplayed when there is issued an instruction for returning the display of the shaped figure to a condition before shaping.

(8)
The information processing device according to any one of (1) to (7), further including:
a recognition unit configured to recognize the content of the handwritten input; and
a shaping unit configured to shape the figure recognized from the handwritten input according to a recognition result from the recognition unit.

(9)
An information processing method of an information processing device including:
acquiring a content of a handwritten input on a touch panel; and
controlling display of a shaped figure which is obtained by shaping a figure recognized from the handwritten input, according to the content of the handwritten input.

(10)
A program storage medium having a program stored therein, the program causing a computer to function as:
an acquisition unit configured to acquire a content of a handwritten input on a touch panel; and
a display control unit configured to control display of a shaped figure which is obtained by shaping a figure recognized from the handwritten input, according to the content of the handwritten input.

REFERENCE SIGNS LIST 10 tablet terminal device
20 pen for tablet 101 control unit
104 touch panel
151 display unit
152 touch sensor
171 handwritten input content acquisition unit
172 handwritten input recognition unit
173 computation processing unit
174 complementation processing unit
175 shaping and conversion processing unit
176 display control unit
300 computer
311 CPU

The invention claimed is:

1. An information processing device, comprising:
a display screen; and
at least one processor configured to:
acquire first content of a first handwritten input on a touch panel;
recognize a figure based on the acquired first content of the first handwritten input;
determine computational data of the first content based on the recognized figure;
generate a shape figure, based on the computational data and a shape modification operation on the recognized figure;
acquire second content of a second handwritten input on the touch panel;
determine a parameter based on the acquired second content; and
control, based on the parameter, the display screen to display the shape figure, wherein the displayed shape figure includes the computational data.

2. The information processing device according to claim 1,
wherein the at least one processor is further configured to:
control execution of a function based on the parameter, and
control the display screen to display the shape figure corresponding to a computational result of the execution of the function.

3. The information processing device according to claim 1,
wherein the at least one processor is further configured to:
execute a complement operation on the recognized figure,
determine a complemented figure based on the execution of the complement operation; and
control the display screen to display the determined complemented figure.

4. The information processing device according to claim 1, wherein the at least one processor is further configured to control, based on a user instruction, the display screen to display the acquired first content, prior to execution of the shape modification operation.

5. The information processing device according to claim 1,
wherein the at least one processor is further configured to:
determine a line type associated with the first handwritten input; and
control the display screen to display the shape figure based on the line type.

6. The information processing device according to claim 5,
wherein the at least one processor is further configured to:
determine a color of the line type associated with the first handwritten input; and
control the display screen to display the shape figure based on the color of the line type.

7. An information processing method, comprising:
in an information processing device:
acquiring first content of a first handwritten input on a touch panel;
recognizing a figure based on the acquired first content of the first handwritten input;
determining computational data of the first content based on the recognized figure;
generating a shape figure, based on the computational data and a shape modification operation on the recognized figure;
acquiring second content of a second handwritten input on the touch panel;
determining a parameter based on the acquired second content; and
displaying the shape figure based on the parameter, wherein the displayed shape figure includes the computational data.

8. A non-transitory computer-readable medium having stored thereon computer-executable instructions that, when executed by a computer, cause the computer to execute operations, the operations comprising:
acquiring first content of a first handwritten input on a touch panel;
recognizing a figure based on the acquired first content of the first handwritten input;
determine computational data of the first content based on the recognized figure;
generating a shape figure, based on the computational data and a shape modification operation on the recognized figure;
acquiring second content of a second handwritten input on the touch panel;
determining a parameter based on the acquired second content; and
displaying the shape figure based on the parameter, wherein the displayed shape figure includes the computational data and the result.

* * * * *